(12) United States Patent
McKeon et al.

(10) Patent No.: US 9,799,073 B2
(45) Date of Patent: Oct. 24, 2017

(54) SYSTEMS AND METHODS FOR ELECTRONIC TRADING

(75) Inventors: John McKeon, New York, NY (US); Frank Trani, New York, NY (US); Jim Grande, New York, NY (US)

(73) Assignee: ITG SOFTWARE SOLUTIONS, INC., Culver City, CA (US)

( * ) Notice: Subject to any disclaimer, the term of this patent is extended or adjusted under 35 U.S.C. 154(b) by 870 days.

(21) Appl. No.: 13/361,292

(22) Filed: Jan. 30, 2012

(65) Prior Publication Data

US 2012/0246053 A1    Sep. 27, 2012

Related U.S. Application Data

(60) Provisional application No. 61/437,285, filed on Jan. 28, 2011.

(51) Int. Cl.
G06Q 40/04    (2012.01)

(52) U.S. Cl.
CPC ..................... *G06Q 40/04* (2013.01)

(58) Field of Classification Search
CPC .. G06Q 20/341; G06Q 30/06; G06Q 30/0633; G06Q 40/04; G06Q 50/12
See application file for complete search history.

(56) References Cited

U.S. PATENT DOCUMENTS

| | | | |
|---|---|---|---|
| 7,702,569 B1 * | 4/2010 | Tanpoco | 705/37 |
| 7,865,422 B2 * | 1/2011 | Lutnick et al. | 705/37 |
| 7,991,679 B2 * | 8/2011 | Kirwin et al. | 705/37 |
| 2003/0004853 A1 * | 1/2003 | Ram et al. | 705/37 |
| 2003/0220853 A1 * | 11/2003 | Back et al. | 705/29 |
| 2005/0044031 A1 * | 2/2005 | Lebedev | 705/37 |
| 2006/0111994 A1 * | 5/2006 | Kedia et al. | 705/35 |
| 2007/0005481 A1 * | 1/2007 | Kedia et al. | 705/37 |

FOREIGN PATENT DOCUMENTS

WO    WO 2004/088460    * 10/2004

OTHER PUBLICATIONS

NASDAQ:The Net Order Imbalance Indicator (NOII) Guide: Access Through the NASDAQ Workstation and Select Service Bureaus, 2008, pp. 1-27.*
Lodon Stock Exchange: Order Book Simulator v2.0Operations Guide, Jul. 2007, pp. 1-37.*

* cited by examiner

*Primary Examiner* — Bijendra K Shrestha
(74) *Attorney, Agent, or Firm* — Rothwell, Figg, Ernst & Manbeck, P.C.

(57) ABSTRACT

Systems and methods of changing electronic trade order properties are provided. A GUI display is provided that displays features regarding placed electronic trade orders. The GUI may include further features for quickly and easily changing features. For example, a first button maybe provided that lists current properties of a selected electronic trade order and is not available for user interaction. A second button may be provided that lists an available change to the current properties of the selected electronic trade order and is available for user interaction. If the second button is activated, one or more electronic cancel and replace orders are executed to create a new order having properties of the selected electronic trade order and at least one changed property that is listed by the second button. The GUI is then updated to reflect the new orders.

19 Claims, 6 Drawing Sheets

SYSTEMS AND METHODS FOR ELECTRONIC TRADING

BACKGROUND OF THE INVENTION

Field of the Invention

The present invention relates generally to the field of financial systems and financial trading displays. More specifically, the invention relates to methodologies for placing, cancelling and replacing electronic trade orders being worked by various brokers at various electronic trading venues from a trader's electronic trading system.

Background of the Related Art

Since the beginning of financial markets, traders have had to account for trade orders that have been placed, executed, cancelled, etc. Until relatively recently, traders kept paper blotters that were little more than traditional accounting books. Technological advancements have led to electronic trading systems capable of performing the functions of the traditional trade blotter in a more automated fashion. Further, these electronic systems have changed the way that traders manage and execute their electronic trade orders.

For example, an order management system (OMS) is an electronic trading system that may allow traders to route electronic trade orders to electronic trading venues and subsequently monitor the electronic trade orders as they are filled (i.e., as the trade orders are worked). Additionally, there are other types of electronic systems have blotter functionality. For example, execution management systems (EMSs) have features that allow traders to place electronic trade orders at electronic trade venues and subsequently monitor the electronic trade orders as they are worked. These types of electronic trading systems often utilize the financial information exchange protocol (FIX protocol) to communicate with other electronic financial systems, including electronic trade venues.

These electronic trading systems, while providing increased functionality, provide an enhanced amount of electronic trade order information. This enhanced electronic trade order information often complicates access to the information within the electronic trading systems. For example, when monitoring electronic trade orders within an electronic trading system, traders often have to open several display windows or menus in order to access vital information. These additional complications contribute to the increased chance of user error and time delay when placing, cancelling and replacing electronic trade orders. For example, the additional complications of an electronic trading system could complicate what should be a relatively simple cancel and replace process.

Because the trading environment is ever-changing, it is important that traders be provided with the ability to quickly place and/or change electronic trade orders, e.g., to account for current market conditions. As described above, electronic trading systems often require complicated steps, such as the opening of multiple display windows and/or menus, in order to place or track electronic trade orders, or even to simply get information regarding the current parameters of a placed electronic trade order. Thus, there is a need for improved systems and methods that more efficiently allow traders to monitor, place, cancel, and replace trade orders that are being worked at various brokers/trading venues from a trader's trading display.

SUMMARY OF THE INVENTION

The present invention solves the existing need in the art by providing a systems and methods for the use of enhanced electronic trading system trading controls. More specifically, the present invention places controls for placing electronic trade orders and/or changing the parameters of already placed electronic trade orders directly on a trader's electronic order blotter. According to various embodiments of the present invention, the electronic order blotter displays any, some, or all of open orders, cancelled orders, contemplated orders, completed orders, or any other order type.

Systems and methods of changing electronic trade order properties are provided. A GUI display is provided that displays features regarding placed electronic trade orders. The GUI may include further features for quickly and easily changing features. For example, a first button maybe provided that lists current properties of a selected electronic trade order and is not available for user interaction. A second button may be provided that lists an available change to the current properties of the selected electronic trade order and is available for user interaction. If the second button is activated, one or more electronic cancel and replace orders are executed to create a new order having properties of the selected electronic trade order and at least one changed property that is listed by the second button. The GUI is then updated to reflect the new orders.

The present invention will become more fully understood from the forthcoming detailed description of preferred embodiments read in conjunction with the accompanying drawings. Both the detailed description and the drawings are given by way of illustration only, and are not limitative of the present invention as claimed.

DETAILED DESCRIPTION OF THE PREFERRED EMBODIMENTS

The present invention provides an enhanced electronic trading display that allows for more efficient trader control over his or her electronic trade order (both placed and unplaced). While the present invention is envisioned for use within OMS and EMS displays, it could also be integrated into other electronic trading tools and systems that allow for the placement and monitoring of electronic trade orders. For example, the present invention could be used to enhance the traders' interactivity with the displays of ITG Inc.'s Channel, Triton, Matrix, and Radical products.

Embodiments of the present invention can be implemented through the use of computer hardware or a combination of computer hardware and computer software. Embodiments of the present invention are envisioned to be used in a client/server network environment, web enabled environment, or other efficient computer architecture. For example, in a client/server environment settings related to the present invention (as discussed in further detail below) could be stored and transmitted from a server computer to a trader's client computer. In one embodiment of the present invention the computer(s) used are configured to run electronic trading systems (e.g., OMS or EMS) and are in electronic communication, via one or more electronic communications networks (e.g., LAN, WAN, Internet) with electronic trade venues. One having ordinary skill in the art would understand that various network topologies could be used to implement the present invention.

As described above, current electronic trading systems have greatly enhanced the trader's ability to control his or her electronic trade order flow. Unfortunately, enhancements have made trader's system more and more complicated. The current invention, according to one embodiment of the present invention, allows a trader to both access electronic trade order information and place (and/or change) electronic trade orders without having to open and close multiple windows or menus within an electronic trading system. According to one embodiment of the present invention, on-display features, such as buttons, mouse-over, etc., can be provided that display the parameters that apply to one or more selected, already placed electronic trade orders. Additionally, these features allow a trader to efficiently alter one or more parameters of one or more selected trade orders, and the invented system is configured to seamlessly make the changes to the orders in the marketplace.

For example, the buttons may be used to alter any or all of an electronic trade order's parameters, including, but not limited to: destination, quantity, order type, limit price, limit price offset, accounts, portfolio codes, regulatory identifications and flags, and algorithmic trading parameters (e.g., strategy name, start and end times, urgency, participation rates, and participation caps). When altering an electronic trade order's parameters, according to the present invention, a cancel and replace order may be utilized.

A cancel and replace order is typically a single message to an electronic trade venue that both cancels an existing electronic trade order at the electronic trade venue and replaces the cancelled order with a new order which might have different properties. A single message can generally be used to send a cancel and replace order so long as the replacement order is submitted to the same broker and electronic trading venue, and the venue accepts such orders. If the replacement order is to be submitted to a different broker or electronic trading venue, a more complicated process called a synthetic cancel and replace order can be used.

A synthetic cancel and replace order appears to the user of an electronic trading system to be a normal cancel and replace order. However, the actual workings are very different. In using a synthetic cancel and replace order, a trader changes the broker or electronic trade destination for the replacement order in the same manner as a normal cancel and replaces order. However, in order to actually effectuate the cancel and replace, the following process is used: (1) the electronic trading system cancels the existing order; (2) the electronic trading system waits for acknowledgement of the cancellation; (3) the electronic trading system calculates the remaining order quantity to account for last-minute fills; and (4) the electronic trading system sends a new order with the updated parameters to an electronic trading venue.

Both normal and synthetic cancel and replace orders may be used to change a variety of parameters of an outstanding electronic trade order. However, other scenarios are more complicated. For example, a trader could submit an electronic trade order to an algorithmic trading product (such as ITG Algorithms$^{SM}$). Algorithmic trading programs divide large electronic trade orders into smaller electronic trade orders and subsequently submit the smaller electronic trade orders to one or more electronic trade venues according to a specific trade strategy. Algorithmic trading programs control various properties of the smaller electronic trade orders, including: time of submission, price, quantity, etc. There are numerous algorithmic trading strategies that are employed by traders. For example, ITG INC., offers at least the following algorithms: participation weighted price, active, flexible participation, volume participation, time weighted average price (TWAP), volume weighted average price (VWAP), best market server, foreign (FX) exchange server, close, float, raider, hedge pro, dynamic implementation shortfall, and dark list. Naturally, in utilizing the various available trading strategies (including, but not limited to, algorithmic trading strategies), traders find that there are certain strategies that work best in certain situations. Moreover, traders often find that they rely on a particular set of strategies more often than other available strategies. The present invention also allows a trader to easily monitor and alter algorithmic trades.

According to one or more embodiments of the present invention, the features can be preset according to a trading firm's or trader's standardized defaults. According to another embodiment of the present invention, the buttons are preset by a trader according to the trader's preferences and/or rules. In one configuration, a trader could preset his or her buttons to always be the same not matter what the current trading conditions or situation. In a different configuration, a trader could implement a series of rules or conditions that determine the buttons that are displayed and available to that trader. Thus, a trader could establish any of the following, non-exclusive and non-limiting, exemplary rules or conditions: broker direction (i.e., restricting the displayed buttons if a selected electronic trade order is required to be worked at a particular broker), broker restriction (i.e., not displaying buttons that are invalid for a particular broker), asset class (i.e., restricting the buttons displayed based on the asset class of the selected electronic trade order, for example futures), regional (i.e., not showing buttons that are invalid for a particular region), and strategy (e.g., only showing VWAP buttons when a selected electronic trade order is a VWAP order).

According to another embodiment of the present invention, a trader could establish rules that are based on both the selected electronic trade order and current market conditions and a selected order's properties (e.g., quantity, price, etc.). Thus, the features for a selected electronic trade order could change based on changing market conditions. Moreover, according to another embodiment, the electronic trading system could generate buttons independent of a trader's rules. These system generated buttons could reflect trading suggestions based on, but not limited to, current market conditions, historical trading data, and a trader's particular preferences (e.g., risk aversion).

According to another embodiment of the present invention, a trader could lock one or more aspects of an electronic trade order, thus altering which buttons are displayed. In one configuration, a trader might lock an order as VWAP, thus restricting any buttons to change the algorithmic strategy but allowing buttons to change the broker of the order. In another configuration, a trader could lock the broker, thus restricting any buttons to change the broker but allowing buttons to change the trading strategy of the selected order at the designated broker.

Figure 1A:
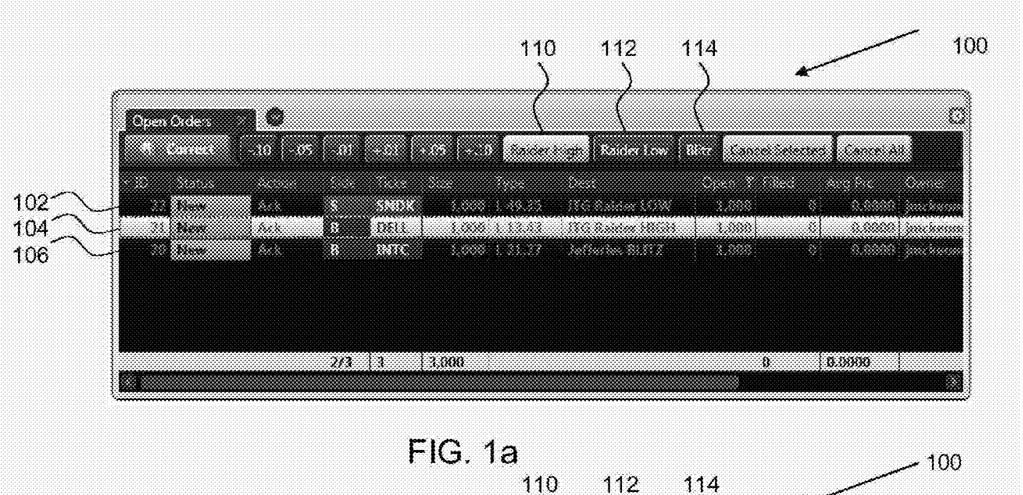
FIGS. 1a-1e are exemplary illustrations of a graphical user interface (GUI) of an electronic trading system.

FIGS. 1a-1e a screen shots of a GUI of an electronic trading system 100 (e.g., OMS or EMS) according to one or more embodiments of the present invention. As illustrated in FIG. 1a, three electronic trade orders 102, 104, 106 are listed in the Open Orders screen of an electronic trading system. The GUI 100 lists fields, which represent parameters of the electronic trade orders. The fields may include ID, Status, Action, Side, Ticker, Size (size of the electronic trade order), Type, Dest (Destination), Open (amount of the electronic trade order still outstanding), Filled (amount of the electronic trade order that has been executed), Avg. Price (average price of the executed portion of the electronic trade order), and Owner for each of the three electronic trade orders 102, 104, 106. For example, electronic trade order 102 has the following properties: ID=22, Status=New, Action=Ack, Side=S (SELL), Ticker=SNDK, Size=1,000, Type=L 49.35 (limit order with a price of $49.35), Dest=ITG Raider LOW (ITG Raider algorithm with low urgency), Open=1,000, Filled=0, Avg. Price=0, and Owner=jmckeon. As discussed above, the buttons of the present invention could be setup, according to various embodiments, to change any or all of the above described properties. Accordingly, the buttons actuate processes (described below) for changing one or more electronic trade orders, including algorithmic orders, already placed in the market place. Additionally, one of ordinary skill in the art would understand that other adjustable properties of an electronic trade order could be altered using various embodiments of the present invention.

As shown in FIG. 1*a*, three GUI features, in this example buttons 110, 112, 114, that are shown for the selected trade order 104. Button 110 corresponds to destination ITG Raider, High urgency. Button 112 corresponds to destination ITG Raider, Low urgency. Button 114 corresponds to destination Jefferies Blitz. Thus, buttons 110 and 112 both correspond to algorithms belonging to the broker ITG, and button 114 corresponds to an algorithm belonging to the broker Jefferies. According to other embodiments of the present invention, the buttons can correspond to other properties (as listed above) of electronic trade orders.

Figure 1B:
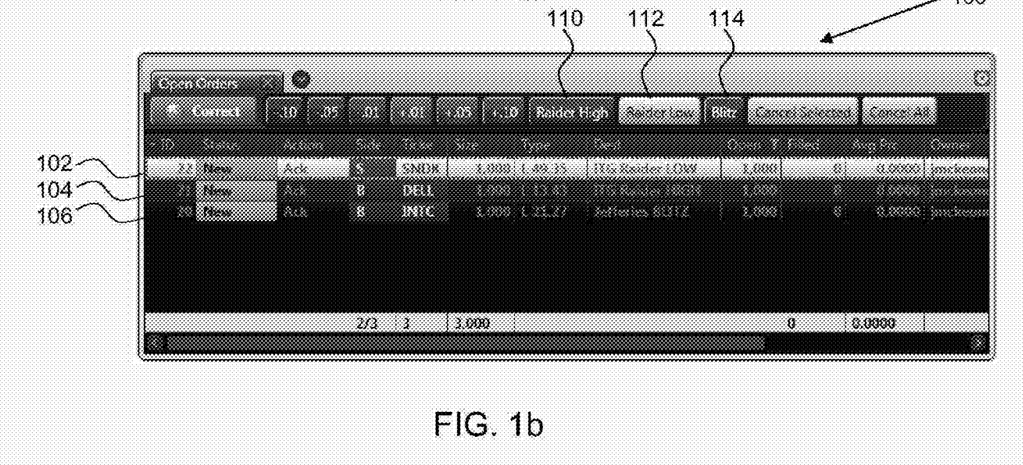

As listed in the GUI 100, electronic trade order 104 has ITG Raider HIGH as a destination. Additionally, as shown in FIG. 1*a*, when electronic trade order 104 is selected, button 110 is a different color, or shown as depressed, and is not selectable (or already selected) because it corresponds to the destination that electronic trade order 104 is currently submitted to (i.e., ITG Raider HIGH). Similarly, as shown in FIG. 1*b*, electronic trade order 102 has ITG Raider LOW as a destination. Thus, when electronic trade order 102 is selected, button 112 is not selectable because it corresponds to the destination that electronic trade order 102 is currently submitted (i.e., ITG Raider LOW).

Figure 1C:
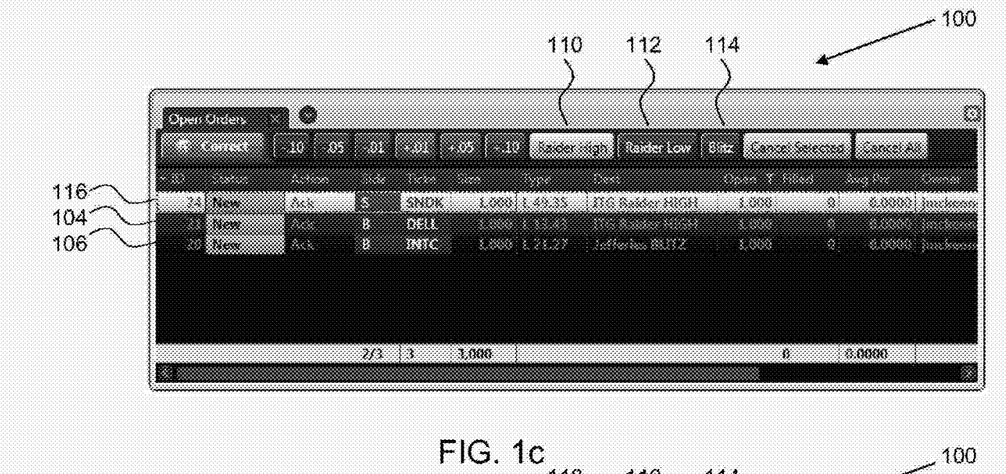

In order to change the destination of electronic trade order 102 from ITG Raider LOW to ITG Raider HIGH, the user of the systems needs only to select electronic trade order 102 and click on button 110 corresponding to the ITG Raider HIGH destination. Once these steps are taken, the electronic trading system executes a cancel and replace order. That is, the electronic trading system cancels electronic trade order 102 and places electronic trade order 116 having the new parameters, as shown in FIG. 1*c*. In this case, electronic trade order 116 is identical to electronic trade order 102 in every way except that the destination is now ITG Raider HIGH. Thus, when electronic trade order 116 is selected, button 110 is not selectable because it corresponds to the destination that electronic trade order 116 is currently submitted (i.e., ITG Raider HIGH). This is an example where a cancel and replace order is used to change the destination of an order at one broker.

Figure 1D:
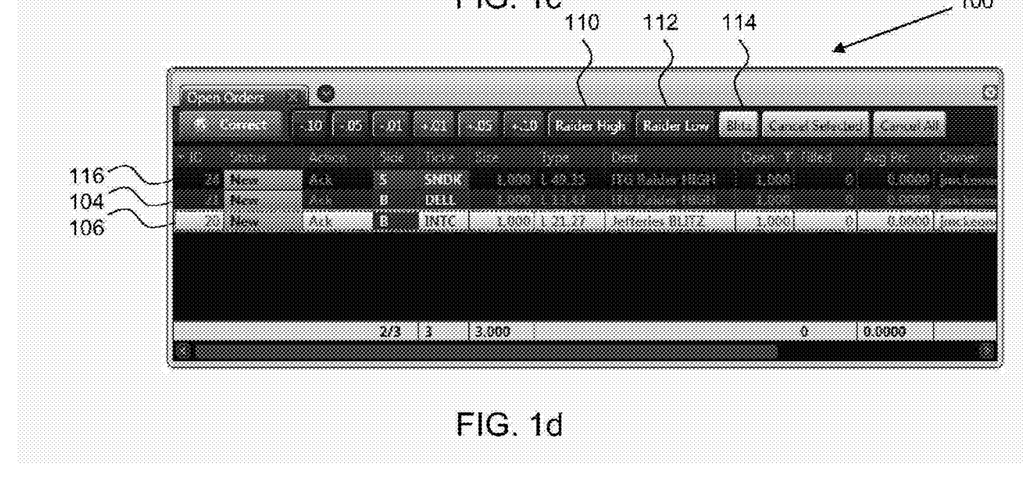
Figure 1E:
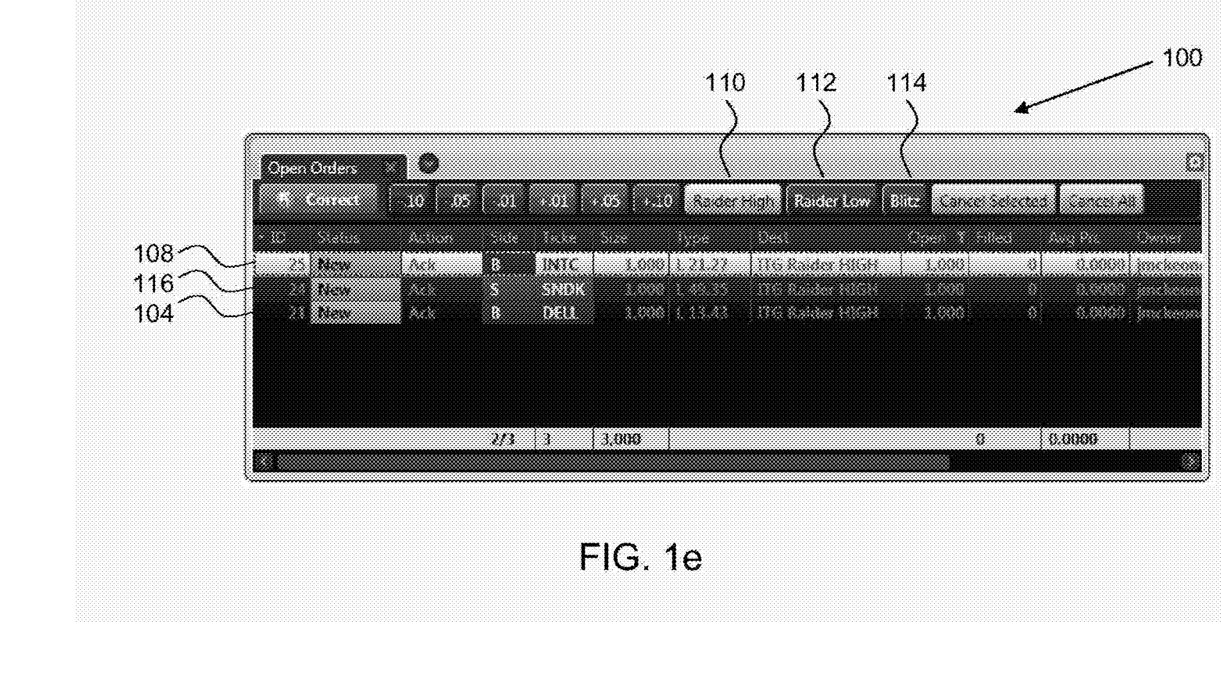

FIG. 1*d* shows electronic trade order 106 is selected. Electronic trade order 106 has the destination Jefferies Blitz. In to change the destination of electronic trade order 106 to ITG Raider HIGH, according to this embodiment, only the button 110 need be actuated. By clicking button 110, the electronic trading system executes a synthetic cancel and replace order for electronic trade order 106. That is, (1) the electronic trading system cancels electronic trade order 106 by, for example, sending a cancel message (e.g., FIX) to the trade destination where the order is residing; (2) the electronic trading system waits for acknowledgement of the cancellation (e.g., confirmation message back from the trade destination); (3) the electronic trading system calculates the remaining order quantity to account for last-minute fills (e.g., fills made in between the time that the user attempts to cancel the order and the time the order is actually cancelled) (in this example there have been no last minute fills); and (4) the electronic trading system sends new electronic trade order 108 to ITG to be executed using the ITG Raider HIGH algorithm. As shown in FIG. 1*e*, electronic trade order 108 is identical in all respects to now cancelled electronic trade order 106, except that the destination has been changed to ITG Raider HIGH. While the synthetic cancel and replace process normally involves detailed manual effort, the use of the present invention hides the complexities of the process from the traders, thus increasing the efficiency of the trader's interaction with their electronic trading system.

Figure 2:
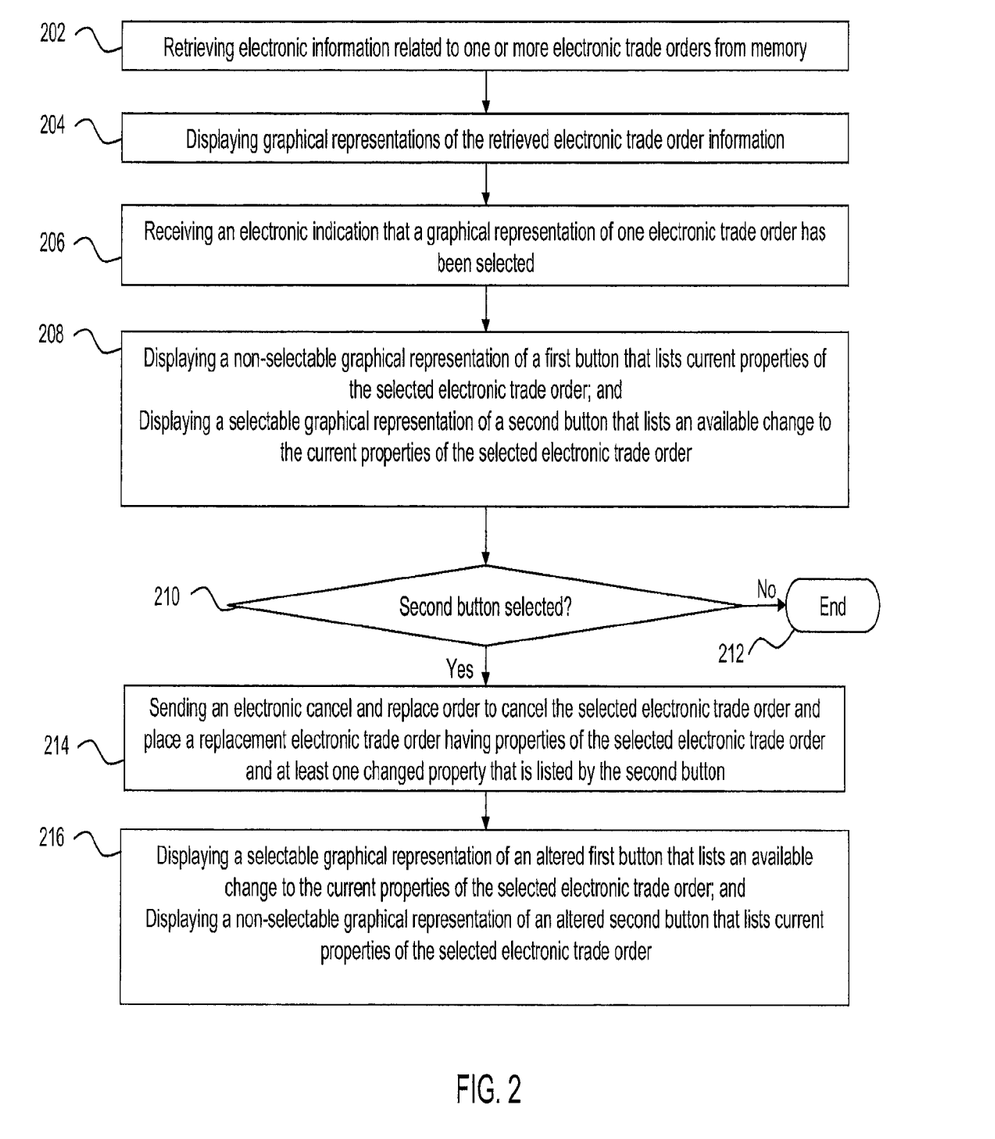
FIG. 2 is a flow diagram illustrating the steps according to an embodiment of the present invention.

FIG. 2 is an exemplary flow diagram for implementing the methods and systems of the present invention. At step 202, electronic trade information is retrieved by an electronic trading system, as described both above and below. For example, an EMS may be connected to market data facilities and memory facilities from which trade information can be obtained.

At step 204, a graphical representation of the retrieved electronic trade information is displayed using an output device (such as a computer monitor) to a user. According to an embodiment of the present invention, the graphical representation might be found in a row on a blotter screen of an EMS, as illustrated in FIGS. 1*a*-1*e*. The skilled person will readily understand that a traditional grid is not the only way to display such information and other ways are contemplated.

At step 206, an electronic indication that a graphical representation of one electronic trade order has been selected is received. For example, an electronic message that the "focus" of the display has been shifted to a particular row could be generated by the system, such as a highlighting of that row. This would occur when a particular row on a blotter is selected by a user. Once a graphical representation of one electronic trade order has been selected, at step 208 one or more changeable features of that order can displayed on the GUI. For example, two buttons might be displayed for altering a feature between two positions. A non-selectable graphical representation of a first button that lists current properties of the selected electronic trade order is displayed. A selectable graphical representation of a second button that lists an available change to the current properties of the selected electronic trade order is also displayed.

At step 210, it is determined if the feature has been changed. For example, if a display component is actuated, such as if the second button is selected. If the second button is not selected, i.e., no order parameter has changed, the process ends at step 212. If an order feature has changed, i.e., the second button has been selected, the process continues at step 214.

At step 214, the order parameter change is effected, for example, by submission of an electronic cancel and replace order to the algorithmic server or corresponding trade venue. This order cancels the selected electronic trade order and places a replacement electronic trade order having properties of the selected electronic trade order and at least one changed property that is listed by the second button. As described above, there are two different types of cancel and replace orders, normal and synthetic. Depending on specifics of a situation either cancel and replace type could be used. For example, if the new trade order is placed with a different broker than the cancelled trade order, a synthetic cancel and replace should be used.

At step 216, two altered buttons are displayed on the GUI. A selectable graphical representation of an altered first button that lists an available change to the current properties of the selected electronic trade order is displayed. Additionally, a non-selectable graphical representation of an altered second button that lists current properties of the selected electronic trade order is displayed. Once the altered graphical representations of the buttons are displayed, the process can be repeated.

Figure 3:
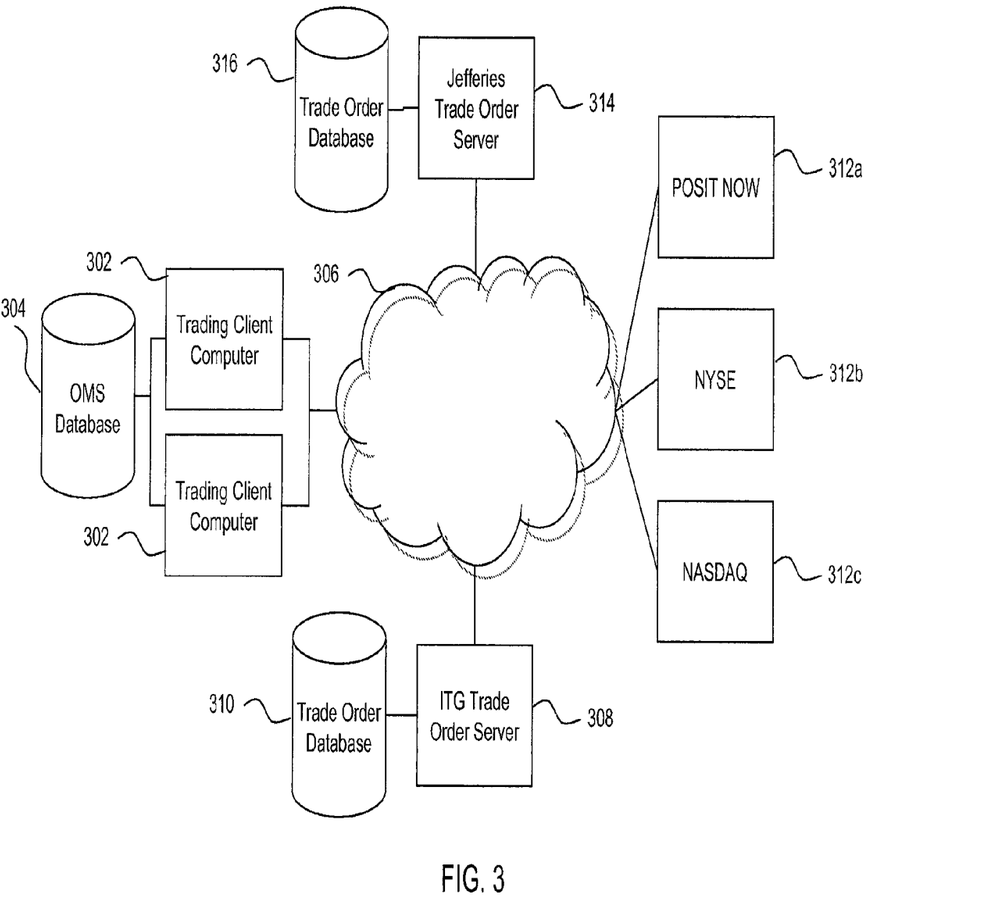
FIG. 3 is a diagram illustrating an exemplary network over which the present invention could be implemented.

FIG. 3 is a block diagram of an exemplary system diagram for an implementation of an embodiment of the present invention. According to an embodiment of the present invention, trading client computers 302 each have installed and/or execute OMS or EMS clients. Additionally, each of trading client computers 302 are in electronic communication with an OMS or EMS database 304, which stores electronic trade information for each attached user of the OMS.

According to an embodiment of the present invention, a user can place an electronic trade order with a broker (in this example ITG), the trading desktop computer is configured to transmit or otherwise communicate an electronic trade order, via an electronic communications network 306 (such as the Internet), to ITG trade order server 308 which is stored in trade order database 310, which is in electronic communication with ITG trade order server 308.

According to this example, the electronic trade order sent to ITG trade order server 308 is an algorithmic trade order, for example a Raider trade order. The ITG trade order server 308 then works the order according to the Raider algorithm by submitting portions of the order to various trade execution venues (such as Posit Now 312*a*, NYSE 312*b*, and NASDAQ 312*c*) at specific prices and/or specific times. According to the present invention, once the electronic trade order is submitted to the ITG trade order server 308, the OMS display on the trading client computer 302 is altered to reflect the placed order.

As described above, the trading client can include a display, such as that shown in FIGS. 1*a*-1*e*. That GUI interface can include features for displaying the order and for changing parameters thereof. For example, when the electronic trade order is selected on the OMS display, two or more buttons can be displayed that are associated with one or more features or parameters associated with the selected order. One of the buttons, which cannot be selected, displays current information regarding the submitted trade order. Thus, this button could, for example, display ITG Raider. At least one other button, which is selectable, displays information that is different from the current trade order information and would alter the properties of the trade order if selected. For example, the second button could display Jefferies Blitz.

According to this example, the user of the trading client computer 302, can click or otherwise actuate a second button displaying, for example, Jefferies Blitz. The methods and systems of the present invention can be configured to execute a synthetic cancel and replace order, as described herein, in response to the change request. In completing this process, the trade order at the ITG trade order server 308 is cancelled, including suborder portions, and a new trade order is sent to Jefferies trade order server 314, via an electronic communications network 306, and stored in trade order database 316, which is in electronic communication with Jefferies trade order server 314. According to this example, the trade order sent to with Jefferies trade order server 314 is an algorithmic trade order, for example a blitz trade order. The Jefferies trade order server 314 then works the order according to the Blitz algorithm by submitting portions of the order to various trade execution venues (such as Posit Now 312*a*, NYSE 312*b*, and NASDAQ 312*c*) at specific prices and/or specific times.

According to the present invention, once the electronic trade order is submitted to the Jefferies trade order server 314, the OMS display on the trading client computer 302 is altered. Now when the electronic trade order is selected on the OMS display, display features can be provided to show the parameters of this order and for changing those parameters. For example, a buttons, which cannot be selected, can be provided to display current information regarding the submitted trade order. This button could, for example, display Jefferies Blitz. At least one other button, which is selectable, can be provided for displaying information that is different from the current trade order information and would alter the properties of the trade order if selected. For example, the second button could display ITG Raider.

Figure 4:
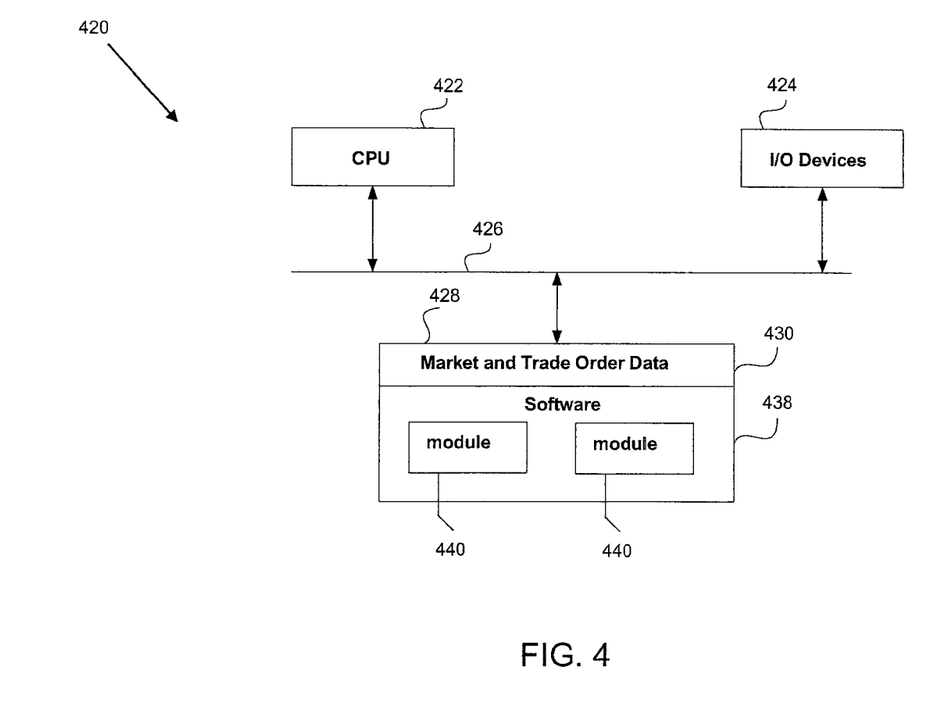
FIG. 4 is a computer diagram illustrating an exemplary apparatus for implementing the present invention.

FIG. 4 shows a particular device, such as a computer system, 420, that can be used as components of the invention to implement one or more features of the systems and methods, described herein, according to a preferred embodiment of the invention. The computer system 420 includes a central processing unit (CPU) 422, which communicates with a set of input/output (I/O) devices 424 over a bus 426. The I/O devices 424 may include a keyboard, mouse, video monitor, printer, etc. The computer system 420 may be in electronic communication with an electronic data network. The computer system, via an electronic data network (e.g., LAN or Internet), may access data storage devices, data feeds, additional processing, and other sources/repositories of computer readable data.

The CPU 422 also communicates with a computer-readable storage medium (e.g., conventional volatile or non-volatile data storage devices) 428 (hereafter "memory 428") over the bus 426. The interaction between a CPU 422, I/O devices 424, a bus 426, and a memory 428 are well known in the art.

Memory 428 can include market and trade order data 430, which includes data on securities (such as stock prices) and data on trade orders (such as size, ticker symbol, and limit price).

The memory 428 also stores software 438. The software 438 may include a number of modules 440 for implementing the steps of the processes described herein. Conventional programming techniques may be used to implement these modules. For example, software for implementing the methods and systems of the present invention could be programmed using any number of computer programming languages, such as: C, C++, C#, Java, Visual Basic, etc.

The invention being thus described, it will be apparent to those skilled in the art that the same may be varied in many ways without departing from the spirit and scope of the invention. For example, rather than using buttons, other display components could be used, such as mouse-over features, drop down list, radio groups, tabs, etc. Further, the systems and methods could be customized to work this any number of trading destinations and types of orders. Any and all such modifications are intended to be included within the scope of the invention.

We claim:

1. A computer implemented method for electronic trading, comprising the steps of:
   providing a graphical user interface that is displayed directly with an electronic order blotter executing on a computer, features regarding electronic trade orders;
   providing a first button within said graphical user interface that lists current properties of a selected one of the electronic trade orders being currently displayed in the electronic order blotter on a display device; and
   providing a second button within said graphical user interface that lists a change that can be made to the current properties of the selected electronic trade order and that is available for user interaction.

2. The method according to claim 1, further comprising the steps of:
   allowing selection of an electronic trade order listed on said graphical user interface;
   upon activation of said second button, executing one or more electronic cancel and replace orders to create a new order in the marketplace having properties of said selected electronic trade order and at least one changed property that is listed by said second button; and
   updating said graphical user interface to display said new order.

3. The method according to claim 1, further comprising the step of:
   allowing selection of an electronic trade order listed on said graphical user interface via an electronic input device;
   upon activation of said second button, executing one or more synthetic electronic cancel and replace orders to create a new order in the marketplace having properties of the selected electronic trade order and at least one changed property that is listed by the second button; and
   updating said graphical user interface to display said new order.

4. The method according to claim 1, further comprising the steps of:
   retrieving electronic information related to one or more electronic trade orders from memory;
   displaying graphical representations of the retrieved electronic trade order information; and
   receiving an electronic indication that a graphical representation of one electronic trade order has been selected;
   wherein said steps occur prior to providing a graphical user interface display that displays features regarding placed electronic trade orders directly on a trader's electronic order blotter.

5. The method according to claim 1, wherein said first and second buttons correspond to trade parameters including quantity, order type, limit price, limit price offset, accounts, portfolio codes, regulatory identifications and flags, and algorithmic trading parameters.

6. The method according to claim 1, further comprising the step of:
   presetting first and second buttons to remain constant regardless of current trading conditions.

7. The method according to claim 1, further comprising the step of:
   presetting said first and second buttons according to a trading firm's standardized defaults.

8. The method according to claim 1, further comprising the step of:
   presetting said first and second buttons according to a trader's preferences.

9. The method according to claim 1, further comprising the step of:
   presetting said first and second buttons according to at least one trader's rule.

10. The method according to claim 9, wherein said trader's rule is based on broker direction, broker restriction, asset class, regional, or strategy.

11. A system for electronic trading, comprising:
   a trading client computer configured to operate an electronic trading tool that is capable of placing and monitoring electronic trade orders, and displaying information regarding said electronic trade orders on a graphic user interface display in an electronic order blotter, said trading client computer further configured to transmit an electronic trade order via an electronic communication network to a trade order server, said trade order server further configured to transmit an electronic trade order according to a selected trading algorithm by submitting portions of an electronic trade order to at least one trade execution venue; and
   a trade order database in electronic communication with said client computer;
   wherein said trading client computer is configured to receive and update said graphic user interface based on an electronic trade order placed with at least one trade execution venue;
   wherein said trading client computer is configured to display a first button within said graphical user interface display on a same display as said electronic order blotter, said first button displaying current properties of a selected electronic trade order in said electronic order blotter, and a second button within said graphical user interface on the same display as said electronic order blotter, said second button displaying an available change to the current properties of the selected electronic trade order and is available for user interaction.

12. The system according to claim 11, wherein said first and second buttons correspond to trade parameters and wherein said trade parameters corresponding to quantity, order type, limit price, limit price offset, accounts, portfolio codes, regulatory identifications and flags, and algorithmic trading parameters.

13. The system according to claim 11, wherein said electronic order blotter includes a grid displaying electronic trade orders in rows, and at least one field listing a trade parameter of electronic trade orders.

14. The system according to claim 13, wherein said selected electronic trade order is highlighted on the said grid and wherein said field provides ID, status, action, side, ticker, size of electronic trade order, type, destination, amount of electronic trade order still outstanding, amount of electronic trade order that has been executed, or owner for each electronic trade order.

15. The system according to claim 13, wherein information regarding said electronic trade orders is updated based on placed electronic orders and selection of said first and second buttons.

16. A graphical computer interface for electronic trading, comprising:
   a graphical display on a display device in communication with a trading client computer configured to operate an electronic trading tool that is capable of placing and monitoring electronic trade orders, and displaying information regarding said electronic trade orders on said graphical display on said display device, said trading client computer further configured to transmit an electronic trade order via an electronic communication network to a trade order server, said trade order server further configured to transmit an electronic trade order according to a selected trading algorithm by submitting portions of an electronic trade order to at least one trade execution venue, said trading client computer is configured to receive and update said graphical display on said display device based on an electronic trade order placed with at least one trade execution venue;

wherein said graphical display includes a grid displaying electronic trade orders in rows, and at least one field listing a trade parameter of electronic trade orders, a first button that lists current properties of a selected electronic trade order from said grid, and a second button that lists an available change to the current properties of the selected electronic trade order and is available for user interaction.

17. The graphical computer interface according to claim 16, wherein said first and second buttons correspond to trade parameters and wherein said trade parameters corresponding to quantity, order type, limit price, limit price offset, accounts, portfolio codes, regulatory identifications and flags, and algorithmic trading parameters.

18. The graphical computer interface according to claim 16, wherein said selected electronic trade order is highlighted on the said grid and wherein said field provides ID, status, action, side, ticker, size of electronic trade order, type, destination, amount of electronic trade order still outstanding, amount of electronic trade order that has been executed, or owner for each electronic trade order.

19. The graphical computer interface according to claim 16, wherein information regarding said electronic trade orders is updated based on placed electronic orders and selection of said first and second buttons.

* * * * *